(12) United States Patent
Lee

(10) Patent No.: US 6,851,320 B1
(45) Date of Patent: Feb. 8, 2005

(54) CLOSED-FORM HEAD EXPANDER

(76) Inventor: Kun-Ta Lee, 235 P.O. Box 10-69 Chung-Ho, Taipei (TW)

( * ) Notice: Subject to any disclaimer, the term of this patent is extended or adjusted under 35 U.S.C. 154(b) by 0 days.

(21) Appl. No.: 10/782,885

(22) Filed: Feb. 23, 2004

(51) Int. Cl.⁷ .................................................. B06B 3/00
(52) U.S. Cl. .......................................... 73/663; 73/662
(58) Field of Search ........................ 73/662, 663, 432.1

(56) References Cited

U.S. PATENT DOCUMENTS

| | | | | |
|---|---|---|---|---|
| 3,369,393 A | * | 2/1968 | Farmer | 73/663 |
| 4,633,716 A | * | 1/1987 | Martin | 73/663 |
| 4,715,229 A | * | 12/1987 | Butts | 73/663 |
| 5,277,066 A | * | 1/1994 | Marshall | 73/663 |
| 5,650,569 A | * | 7/1997 | Liu | 73/663 |
| 6,257,067 B1 | * | 7/2001 | Ankrom et al. | 73/663 |

FOREIGN PATENT DOCUMENTS

GB 2211268 A * 6/1989 ............ G01M/7/00

* cited by examiner

*Primary Examiner*—Hezron Williams
*Assistant Examiner*—Rose M. Miller

(57) ABSTRACT

The closed-form HEAD EXPANDER comprises a table surface; one end of each edge surface having a curved side; a trumpet body with a plurality of cambered surfaces downwards reduced from the curved side; an outer annular supporter and an inner annular supporter being connected to and support the trumpet body so as to form a first receiving space and a second receiving space; a plurality of spacing ribs being formed within the inner annular supporter; the plurality of spacing ribs being connected to a central shaft; a plurality of long grooves being formed between the inner annular supporter, the spacing ribs, the central shaft, and a table bottom; and a plurality of cambered sloped surfaces being formed on the surface of the trumpet body and connected to the inner annular supporter and the curved sides so as to equally space the surface of the trumpet body.

2 Claims, 7 Drawing Sheets

CLOSED-FORM HEAD EXPANDER

FIELD OF THE INVENTION

The present invention relates to vibrating tables, and particular to a closed-form HEAD EXPANDER, wherein the vibrating table is fixed to a vibration tester by screwing; then a testing object is placed on the table surface; a fixture serves to fix the testing object by screwing or belt; the testing object is tested by the vibration tester; since the vibrating table is a close form structure, the gravitational center thereof is stable; thereby, precise testing data can be got for further improving the testing object.

BACKGROUND OF THE INVENTION

With reference to FIGS. 6 and 7, a vibration tester serves to perform the vibration test of various testers E for acquire testing data. The vibration tester has wide applications, such as used in testing locking devices or loosing tests for the connection embedding objects which are necessary to be tested for assuring the quality of the objects. The vibrating table A is a key component for determining the precision of data. The prior art vibrating table has a table surface B. A bottom of the table surface is formed with symmetric supporting ribs C.

However, above mentioned prior art has the following defects. The assembly of the symmetric supporting ribs C and the table surface B is an expanding structure which is weak and generates vibration in measuring. The test data cannot get precise data and thus the development of the object is affected, for example, improvement of the object cannot be achieved quickly.

SUMMARY OF THE INVENTION

Accordingly, the primary object of the present invention is to provide a closed-form HEAD EXPANDER, wherein the vibrating table is fixed to a vibration tester by screwing; then a testing object is placed on the table surface; a fixture serves to fix the testing object by screwing; the testing object is tested by the vibration tester; since the vibrating table is a close form structure vibrating table more strong than open type and it can reduce large times magnify resonance, the gravitational center thereof is stable; thereby, precise testing data can be got as measure data of the testing object so as to improve the testing object.

To achieve above objects, the present invention provides a closed-form HEAD EXPANDER wherein a testing object is placed on a vibrating table; the vibration tester causes the testing object for measuring desired data. The closed-form HEAD EXPANDER comprises a vibration tester having a table surface; a plurality of screw holes being formed on the table surface; a plurality of via holes being formed on the edge surfaces of the table surface; one end of each edge surface having a curved side; a trumpet body with a plurality of cambered surfaces downward reduced from the curved side; an outer annular supporter and an inner annular supporter being connected to and support the trumpet body so as to form a first receiving space and a second receiving space; a plurality of through holes being formed on the trumpet body; a plurality of spacing ribs being formed within the inner annular supporter; the plurality of spacing ribs being connected to a central shaft; a plurality of long grooves being formed between the inner annular supporter, the spacing ribs, the central shaft, and a table bottom; an upper end of each spacing rib between the inner annular supporter and the central shaft is formed with a plurality of screw holes; and a plurality of cambered sloped surfaces being formed on the surface of the trumpet body and connected to the inner annular supporter and the curved sides so as to equally space the surface of the trumpet body.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 2:
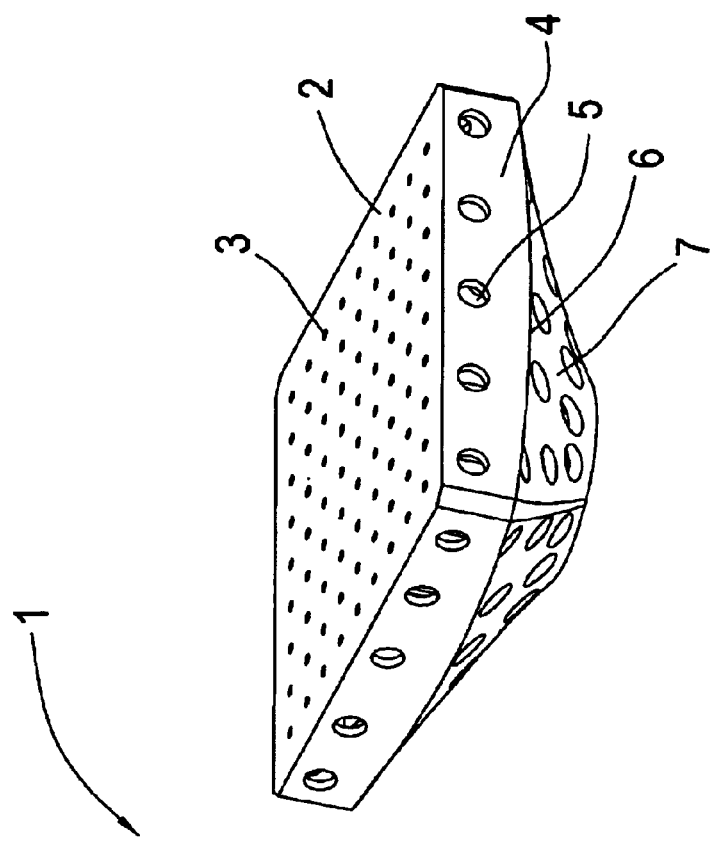
FIG. 2 is a perspective view of the vibrating table according to the present invention.
Figure 2:
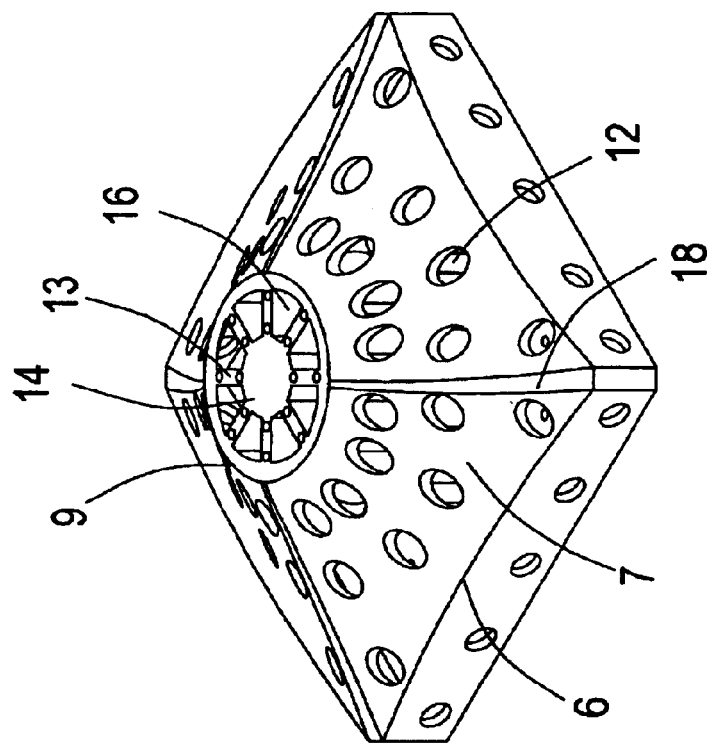
Figure 3:
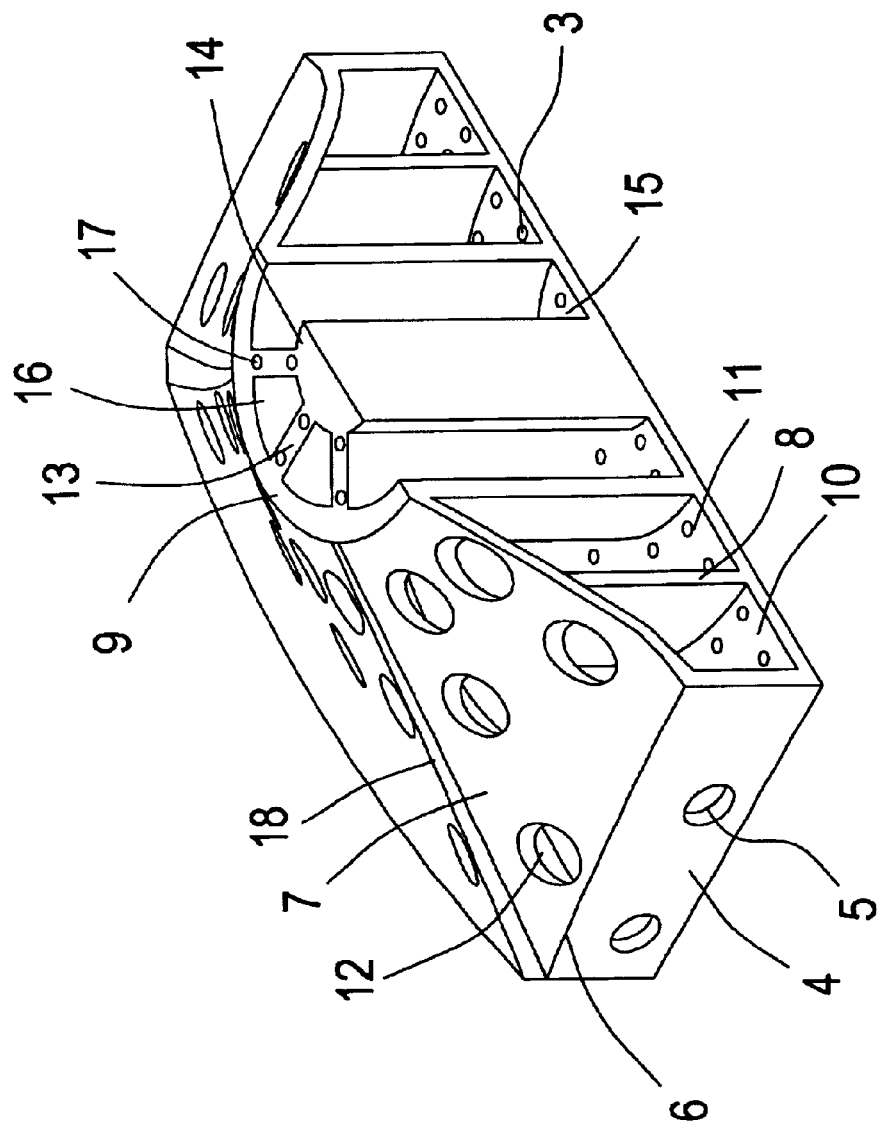
FIG. 3 is a cross section view of the vibrating table of the present invention.
Figure 5:
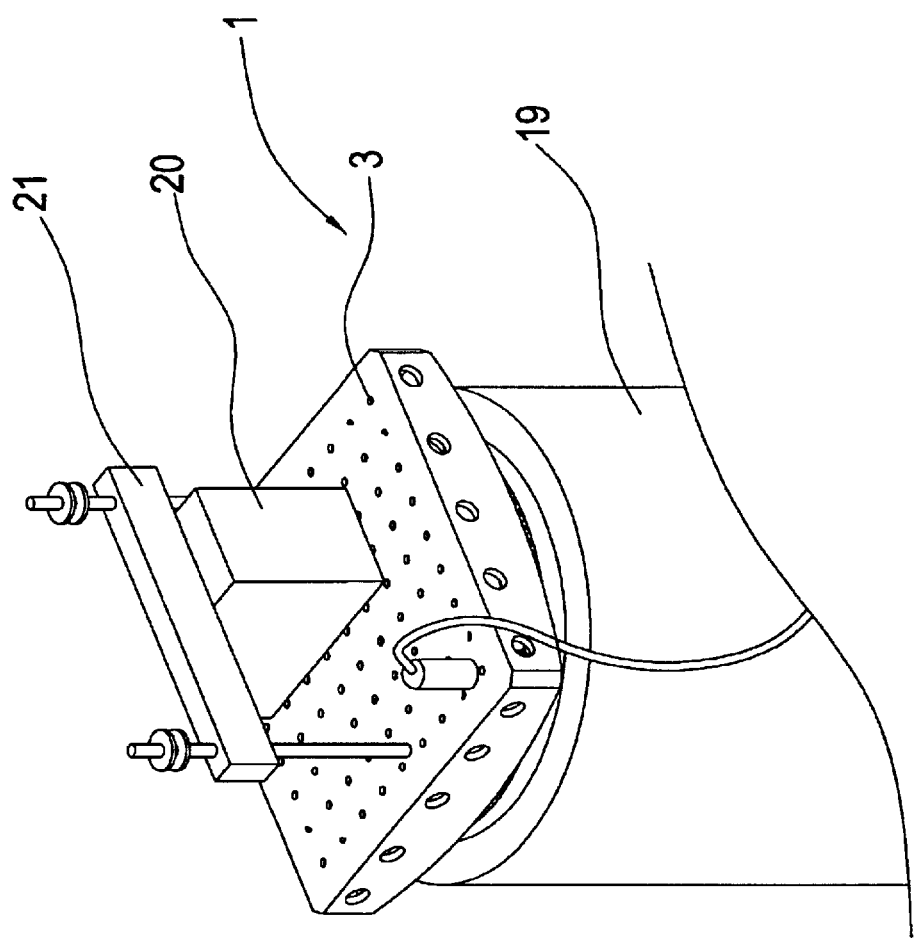
FIG. 5 shows one application of the present invention.
Figure 6:
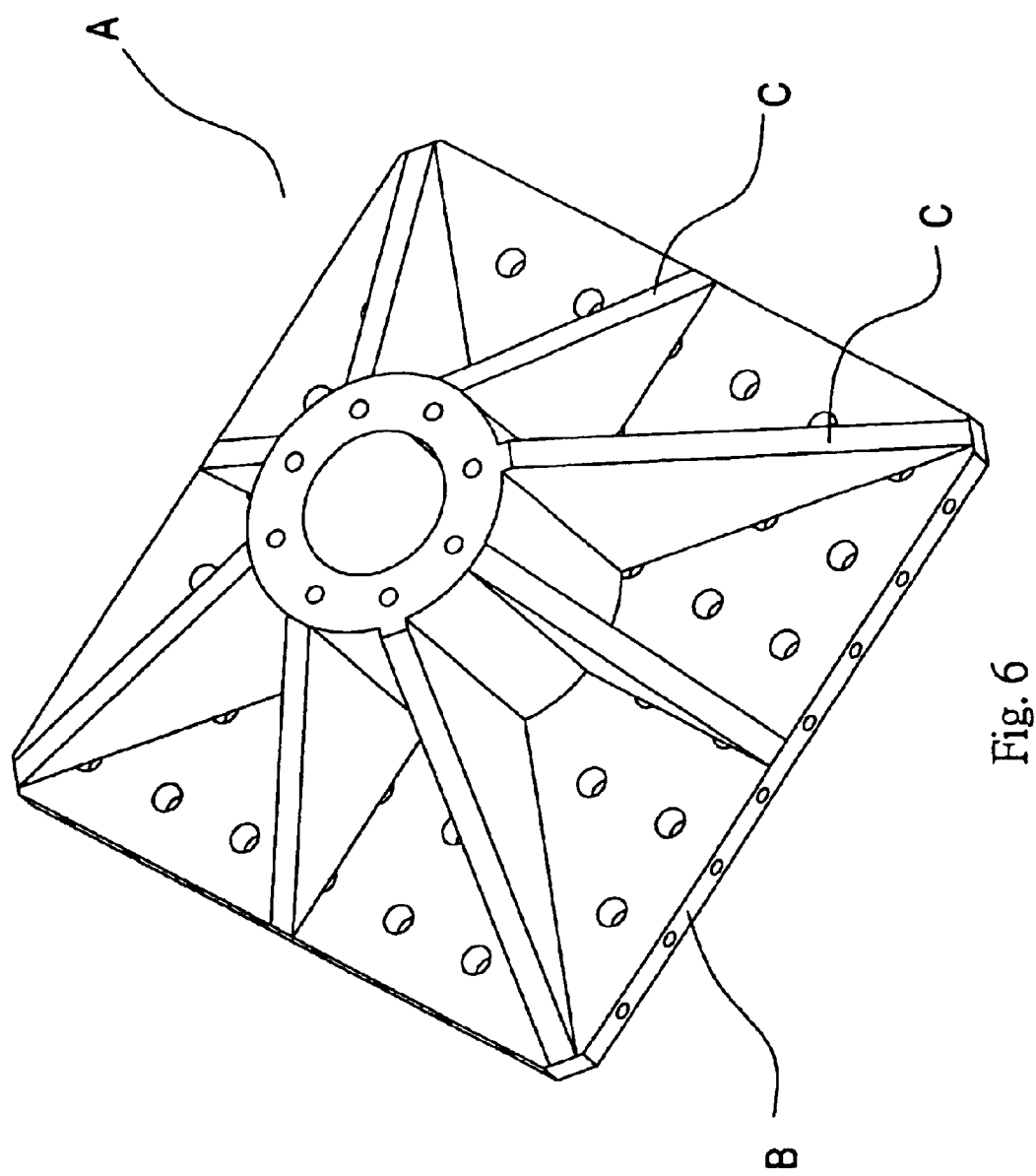
FIG. 6 is a perspective view about the prior art vibrating table.
Figure 7:
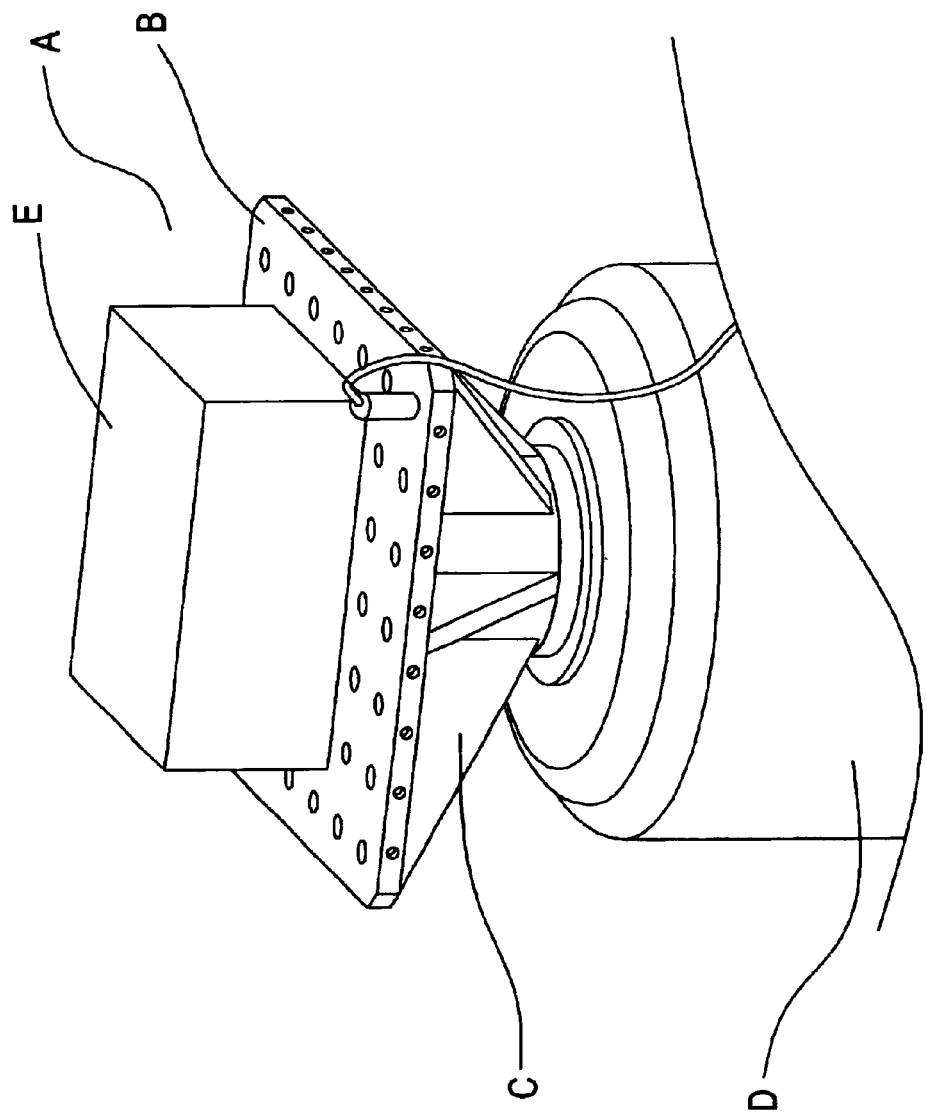
FIG. 7 is the application of the vibrating table of the present invention.

With reference to FIGS. 2, 3 and 5, a closed-form HEAD EXPANDER of the first embodiment of the present invention is illustrated. In the closed-form HEAD EXPANDER of the present invention, a testing object 20 is placed on a vibrating table. Then the testing object vibrats by an vibration tester so as to get desired data. The closed-form HEAD EXPANDER of the present invention has the following elements.

A vibration tester 1 has a table surface 2. A plurality of screw holes 3 are formed on the table surface 2. A plurality of via holes 5 are formed on the edge surfaces 4 of the table surface 2. One end of each edge surface 4 is a curved side 6. A trumpet body 7 with cambered surfaces is downward reduced from the curved side 6. An outer annular supporter 8 and an inner annular supporter 9 are connected to and support the trumpet body 7 so as to form a first receiving space 10 and a second receiving space 11. A plurality of through holes 12 are formed on the trumpet body 7. A plurality of spacing ribs 13 are formed within the inner annular supporter 9. The plurality of spacing ribs 13 are connected to a central shaft 14. A plurality of long grooves 16 are formed between the inner annular supporter 9, the spacing ribs 13, the central shaft 14, and a table bottom 15. An upper end of each spacing rib 13 between the inner annular supporter 9 and the central shaft 14 is formed with a plurality of screw holes 17. Four cambered sloped surfaces 18 are formed on the surface of the trumpet body 7 and connected to the inner annular supporter 9 and the curved sides 6 so as to equally space the surface of the trumpet body 7 into four parts.

The vibrating table 1 is fixed to a vibration tester 19 by screwing to the sound holes 17. Then a testing object 20 is placed on the table surface 2. A fixture 21 serves to fix the testing object 20 by screwing the sound holes 3. The testing object 20 is tested by the vibration tester 19. Since the vibrating table 1 is a close-form vibrating table, it has a preferred structural strength and symmetrical structure, and is light-weighted so that the gravitational center thereof is stable. Thereby, precise testing data can be got as measuring data of the testing object 20 so as to improve the testing object 20 (for example, a position of the gravitation center or the applied force to a locking device) so as to save developing time period of the testing object.

Figure 1:
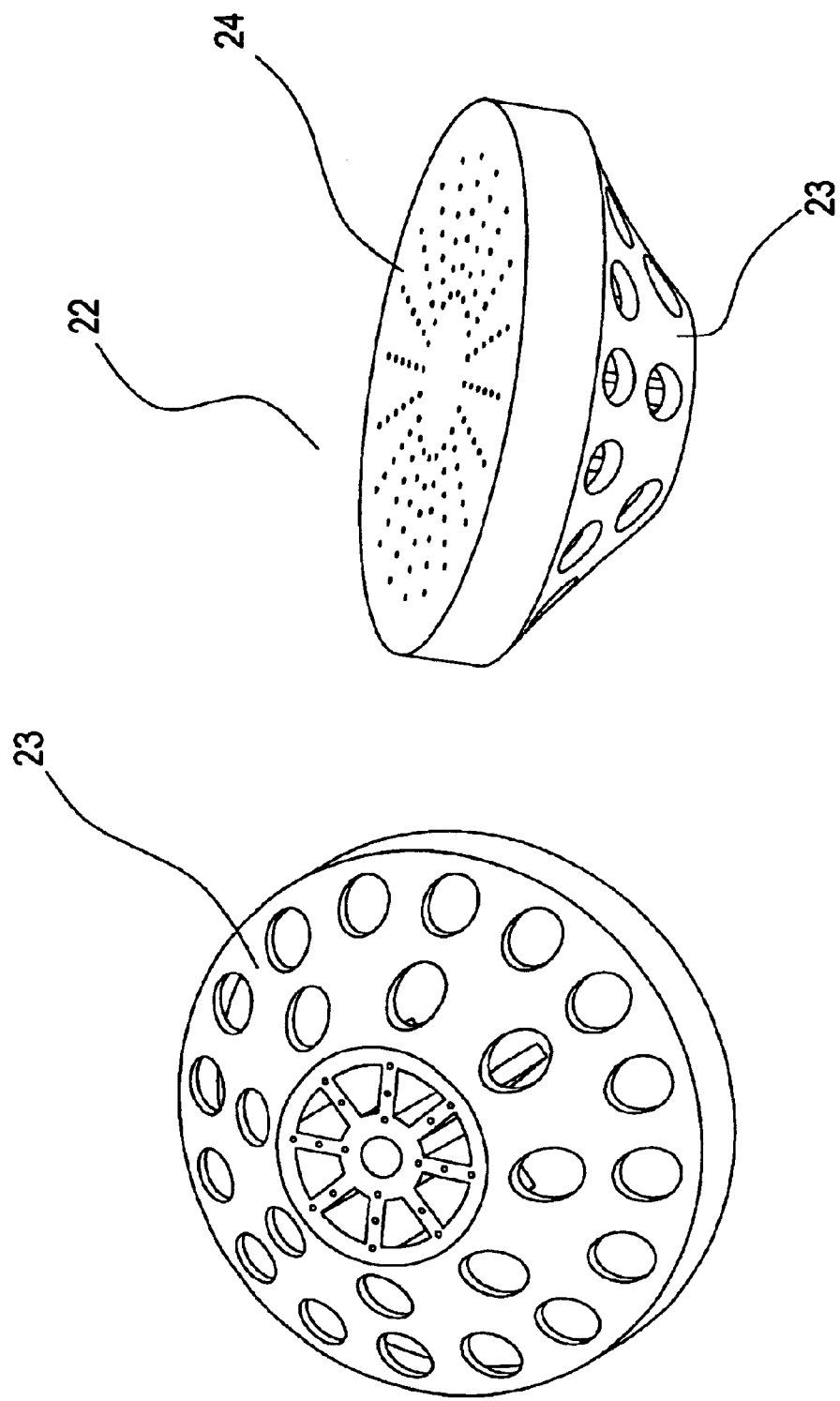
FIG. 1 is a perspective view of a vibrating table of the first embodiment of the present invention.
Figure 4:
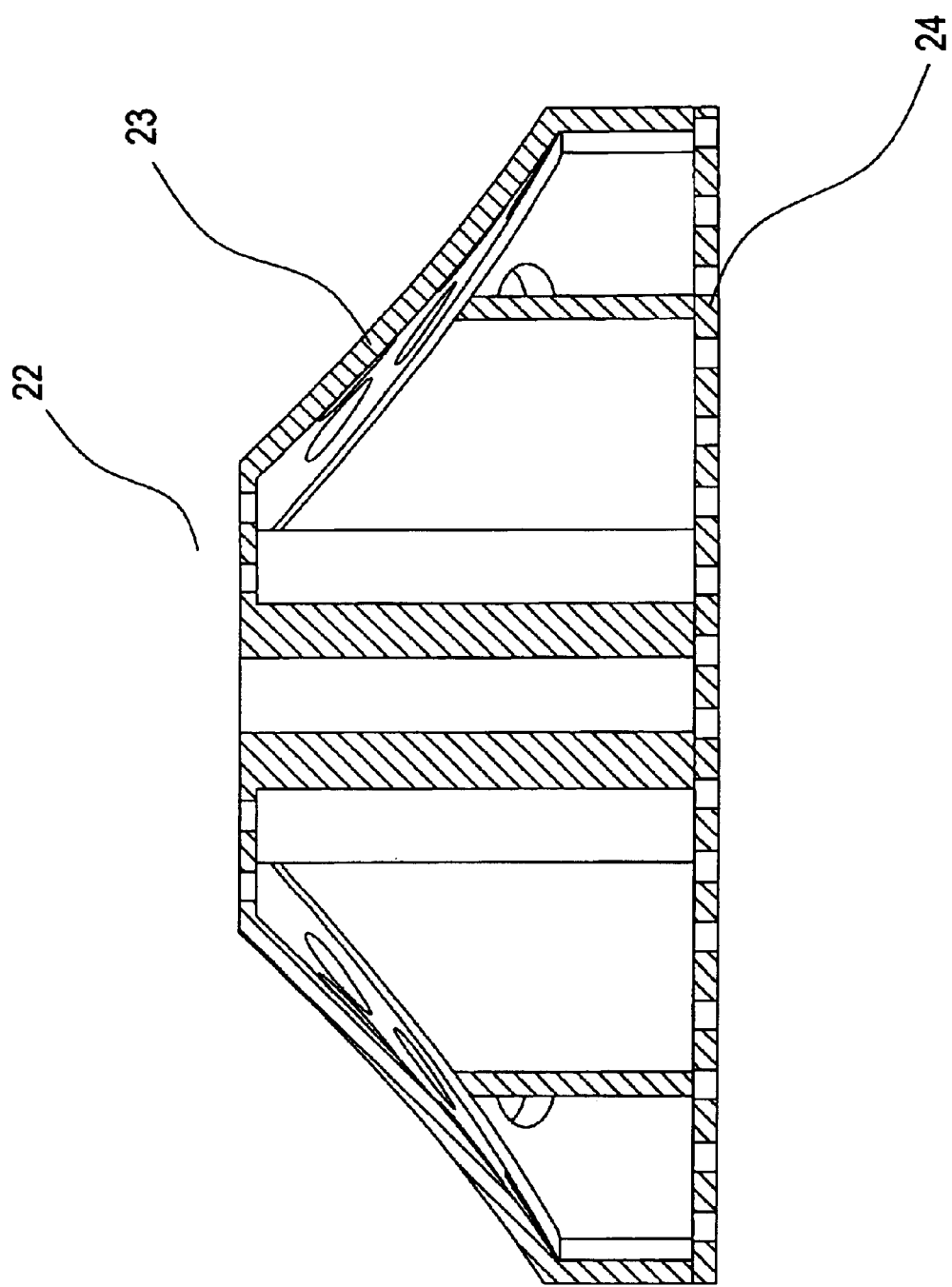
FIG. 4 if a cross section view of a vibrating table of the second embodiment of the present invention.

Referring to FIGS. 1 and 4, the second embodiment of the present invention is illustrated. In this embodiment, the vibrating table 1 (referring to FIGS. 1 and 4) can be replaced by a round disk vibrating table 22. The vibrating table of this embodiment is identical to that in the first embodiment except that the surface of the trumpet body 7 is concave cambered surfaces 23. Likewise, the vibrating table 22 is also stable as it is placed on the vibration tester 19 so as to acquire precise test data.

Referring to drawings, in the operation of the present invention, the closed-form HEAD EXPANDER 1 is fixed to the vibration tester 19. Screws (not shown) serve to lock the screw holes 17. Then a testing object 20 is placed on the table surface 2. A fixture 21 serves to fix the testing object 20 through the screw holes 3. The testing object 20 is tested by the vibration tester 19 for acquiring precise data.

Advantages of the present invention will be described herein. The closed-form HEAD EXPANDER of the present invention is light-weighted, cheap and consumes little power. The closed-form HEAD EXPANDER will confine the vertical supporter will not vibrate so as to increase the rigidity of the structure. Since the present invention has a preferred rigidity without vibration, precise data can be acquired. The vibrating table is replaceable easily so that the test time can be reduced; as a result the testing efficiency is increased.

The present invention is thus described; it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A closed-form HEAD EXPANDER for testing a testing object placed on a vibrating table and measuring data by inducing the testing object to vibrate by a vibrating tester; the closed-form HEAD EXPANDER comprising:

a table surface; a plurality of screw holes being formed on the table surface; a plurality of via holes being formed on the edge surfaces of the table surface; one end of each edge surface having a curved side;

a trumpet body with a plurality of cambered surfaces downwards reduced from the curved side; a plurality of through holes being formed on the trumpet body;

an outer annular supporter and an inner annular supporter being connected to and support the trumpet body so as to form a first receiving space and a second receiving space, respectively;

a plurality of spacing ribs being formed within the inner annular supporter; the plurality of spacing ribs being connected to a central shaft; a plurality of long grooves being formed between the inner annular supporter, the spacing ribs, the central shaft, and a table bottom; an upper end of each spacing rib between the inner annular supporter and the central shaft being formed with a plurality of screw holes;

a plurality of cambered sloped surfaces being formed on the surface of the trumpet body and connected to the inner annular supporter and the curved sides so as to equally space the surface of the trumpet body;

wherein in application, the vibrating table is fixed to the vibration tester by screwing; then a testing object is placed on the table surface; a fixture serves to fix the testing object by screwing; the testing object is tested by the vibration tester; since the vibrating table is a close form vibrating table, the gravitational center thereof is stable; thereby, precise testing data about the testing object is measured.

2. The closed-form HEAD EXPANDER as claimed in claim 1, wherein the vibrating table is a round disk shape vibrating table and the surfaces of the trumpet body are concave cambered surfaces.

* * * * *